United States Patent
Nikam (10) Patent No.: US 8,996,897 B2
(45) Date of Patent: Mar. 31, 2015

(54) AUTOMATIC BACKLIGHT INTENSITY ADJUSTMENT IN AN EMBEDDED OPERATING SYSTEM ENVIRONMENT

(75) Inventor: Sachin Krishna Nikam, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 598 days.

(21) Appl. No.: 13/228,480

(22) Filed: Sep. 9, 2011

(65) Prior Publication Data

US 2013/0067255 A1 Mar. 14, 2013

(51) Int. Cl.
| | | |
|---|---|---|
| G06F 1/32 | (2006.01) | |
| G06F 1/00 | (2006.01) | |
| G06F 11/30 | (2006.01) | |
| G09G 5/00 | (2006.01) | |
| G09G 5/10 | (2006.01) | |
| G06F 1/26 | (2006.01) | |

(52) U.S. Cl.
CPC ............. G06F 1/3212 (2013.01); *G06F 1/32* (2013.01); *G09G 2320/0626* (2013.01); *G09G 2320/06* (2013.01); *G06F 1/26* (2013.01); G06F 1/3265 (2013.01); *Y02B 60/1242* (2013.01)
USPC ........... 713/320; 713/300; 713/340; 345/211; 345/212; 345/690

(58) Field of Classification Search
CPC ........... G06F 1/26; G06F 1/32; G06F 1/3212; G06F 1/3265; G09G 2320/06; G09G 2320/0626
USPC ........... 713/300, 320, 340; 345/211, 212, 690
See application file for complete search history.

(56) References Cited

U.S. PATENT DOCUMENTS

| | | | | |
|---|---|---|---|---|
| 5,493,685 | A * | 2/1996 | Zenda ........................... | 713/340 |
| 5,560,022 | A * | 9/1996 | Dunstan et al. ............... | 713/300 |
| 6,272,542 | B1 * | 8/2001 | Barnes et al. ................. | 709/224 |
| 8,358,262 | B2 | 1/2013 | Degwekar et al. | |
| 8,407,502 | B1 | 3/2013 | Guy et al. | |
| 2003/0001815 | A1 * | 1/2003 | Cui ............... | 345/102 |
| 2003/0028628 | A1 * | 2/2003 | Irwin et al. .................... | 709/222 |
| 2004/0104709 | A1 * | 6/2004 | Yamaji et al. ................. | 320/150 |
| 2004/0183765 | A1 | 9/2004 | Morisawa | |
| 2005/0057484 | A1 | 3/2005 | Diefenbaugh et al. | |
| 2005/0221791 | A1 * | 10/2005 | Angelhag .................. | 455/343.5 |
| 2007/0229518 | A1 * | 10/2007 | Kii et al. ....................... | 345/520 |

(Continued)

FOREIGN PATENT DOCUMENTS

| | | |
|---|---|---|
| EP | 1569194 A1 | 8/2005 |
| EP | 1569423 A1 | 8/2005 |

*Primary Examiner* — Ji H Bae
(74) *Attorney, Agent, or Firm* — Zilka-Kotab, PC (57) ABSTRACT

A method includes monitoring, through a battery driver component of a embedded operating system executing on a data processing system deriving power from a battery, a state of the battery. The method also includes modifying, through a backlight driver component of the embedded operating system, an intensity level of a backlight of one or more Input/Output (I/O) devices of the data processing system from a current level associated with a normal operation thereof to an intensity level lower than the current level when the battery is detected to be in a critical state to prolong a lifetime thereof. The critical state is associated with a remaining charge on the battery being below a threshold required to maintain the data processing system in a powered on state.

20 Claims, 5 Drawing Sheets

(56) References Cited

U.S. PATENT DOCUMENTS

| | | |
|---|---|---|
| 2008/0165116 A1 | 7/2008 | Herz et al. |
| 2009/0070606 A1* | 3/2009 | Chen et al. .................... 713/320 |
| 2009/0109246 A1* | 4/2009 | Oh ................................ 345/690 |
| 2010/0237697 A1* | 9/2010 | Dunn et al. .................... 307/31 |
| 2010/0275266 A1* | 10/2010 | Jakobson et al. ............... 726/26 |
| 2011/0113121 A1* | 5/2011 | Sarkar ........................... 709/218 |
| 2012/0262093 A1 | 10/2012 | Recker et al. |
| 2012/0288139 A1* | 11/2012 | Singhar ......................... 382/103 |

* cited by examiner

AUTOMATIC BACKLIGHT INTENSITY ADJUSTMENT IN AN EMBEDDED OPERATING SYSTEM ENVIRONMENT

FIELD OF TECHNOLOGY

This disclosure relates generally to data processing systems and, more particularly, to a method, an apparatus and/or a system of automatic backlight intensity adjustment in an embedded operating system environment to prolong a battery lifetime.

BACKGROUND

A data processing system (e.g., a mobile phone) may derive power from a battery. A backlight associated with an Input/Output device (e.g., a display, a keyboard, a mouse, a touch screen etc.) of the data processing system may consume more battery power than other components of the data processing system. Even when a remaining charge on the battery decreases below a "critical" threshold required to maintain the data processing system in a powered on state, a user of the data processing system may be performing a desired task thereon. The user may have to charge the battery immediately and/or perform the desired task hastily in order to circumvent inconvenience associated with the impending switching off of the data processing system. If the data processing system is switched off prior to the user saving data associated with the desired task on the data processing system, the unsaved data may be lost, thereby frustrating the user and/or requiring the user to restart the desired task from scratch or from an earlier state thereof.

SUMMARY

Disclosed are a method, an apparatus and/or a system of automatic backlight intensity adjustment in an embedded operating system environment to prolong a battery lifetime.

In one aspect, a method includes monitoring, through a battery driver component of an embedded operating system executing on a data processing system deriving power from a battery, a state of the battery. The method also includes modifying, through a backlight driver component of the embedded operating system, an intensity level of a backlight of one or more Input/Output (I/O) device(s) of the data processing system from a current level associated with a normal operation thereof to an intensity level lower than the current level when the battery is detected to be in a critical state to prolong a lifetime thereof. The critical state is associated with a remaining charge on the battery being below a threshold required to maintain the data processing system in a powered on state.

In another aspect, a method includes monitoring, through a battery driver component of an embedded operating system executing on a data processing system deriving power from a battery, a state of the battery. The method also includes maintaining, through a backlight driver component of the data processing system, a backlight of one or more I/O device(s) of the data processing system at an intensity level lower than an intensity level associated with a normal operation thereof when the battery is detected to be in a critical state by the battery driver component. The critical state is associated with a remaining charge on the battery being below a threshold required to maintain the data processing system in a powered on state. Further, the method includes modifying, through the backlight driver component, the intensity level of the backlight back to the intensity level associated with the normal operation when the battery is detected to be out of the critical state by the battery driver component.

In yet another aspect, a data processing system executing an embedded operating system thereon includes a battery, a battery driver component integrated with the embedded operating system executing on the data processing system, one or more I/O device(s), a backlight associated with the one or more I/O device(s), and a backlight driver component integrated with the embedded operating system. The battery driver component is configured to monitor a state of the battery when the data processing system derives power from the battery. The backlight driver component is configured to modify an intensity level of the backlight from a current level associated with a normal operation of the data processing system to an intensity level lower than the current level when the battery is detected to be in a critical state to prolong a lifetime of the battery. The critical state is associated with a remaining charge on the battery being lower than a threshold required to maintain the data processing system in a powered on state.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or an apparatus of automatic backlight intensity adjustment in an embedded operating system environment to prolong a battery lifetime. Although the present embodiments have been described with reference to specific example embodiments, it will be evident that various modifications and changes may be made to these embodiments without departing from the broader spirit and scope of the various embodiments.

Figure 1:
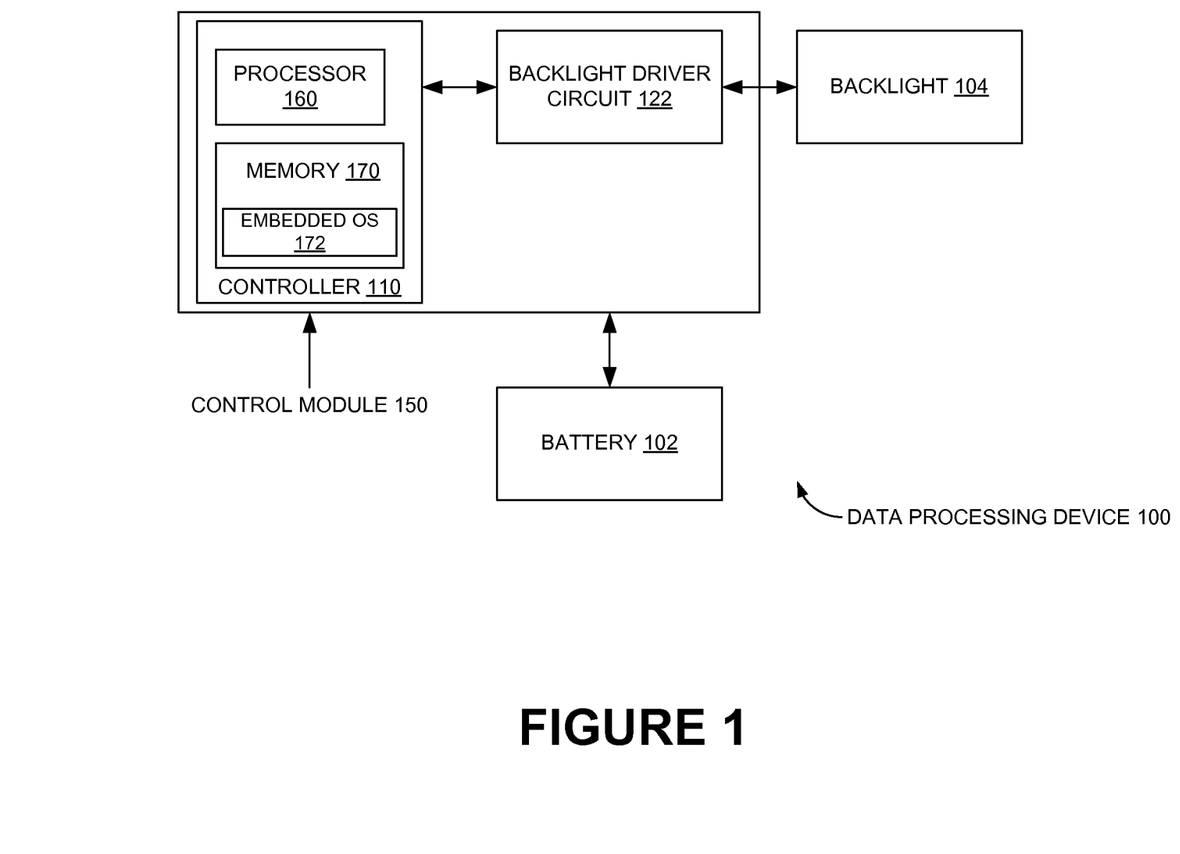
FIG. 1 is a schematic view of a data processing system including a battery and a backlight, according to one or more embodiments.

FIG. 1 shows a block diagram of data processing system 100 including battery 102 and backlight 104, according to one or more embodiments. In one or more embodiments, data processing system 100 may be a portable device (e.g., a mobile phone, a portable media player) or even a laptop, a desktop Personal Computer (PC) and the like. FIG. 1 shows data processing system 100 as a mobile phone merely as an example. In one or more embodiments, data processing system 100 may include a controller 110 (e.g., a processor 160 and/or a memory 170) configured to control functionalities associated with data processing system 100. In one or more embodiments, memory 170 shown in FIG. 1 may include storage locations configured to be addressable through processor 160. In one or more embodiments, a real-time embedded operating system (e.g., embedded OS 172) may execute on data processing system 100. FIG. 1 shows operating system (e.g., embedded OS 172) instructions as being stored in memory 170. Functionalities associated with a mobile phone (or even, a desktop PC and a laptop) are well known to one of ordinary skill in the art, and, therefore, FIG. 1 merely shows elements that are essential to understand concepts associated with the exemplary embodiments discussed herein.

Real-time embedded operating system(s) may be preferentially utilized in exemplary embodiments discussed herein, as the aforementioned operating system(s) are associated with serving real-time application requests. In other words, a real-time embedded operating system may respond to a request within a specific time period and may be characterized by minimal interrupt latency. Scheduling in a real-time embedded operating system may be more advanced than in a non-real-time operating system. Also, a real-time embedded operating system may be more associated with speed and/or predictability of response to a request thereto than an ability to handle a large quantity of work. Examples of real-time embedded operating systems include but are not limited to Windows® Embedded Compact (WinCE) and Palm OS®, Although real-time embedded operating system(s) are preferentially utilized, the use of non-real-time embedded operating systems (e.g., Android™, Apple®'s iOS®) is also within the scope of the exemplary embodiments.

FIG. 1 shows controller 110 as being configured to manage backlight driver circuit 122 that is configured to switch on/off backlight 104 based on a control signal from controller 110. Also, controller 110 is shown along with backlight driver circuit 122 as being part of a control module 150 configured to control backlight 104 (e.g., a Light Emitting Diode (LED) device). In one or more embodiments, as data processing system 100 may be configured to derive power from battery 102, battery 102 is shown as being interfaced with control module 150. It is obvious that control module 150 may include other elements necessary for the functioning of data processing system 100. For example, control module 150 may be configured to modify power levels (e.g., dim, switch off) of backlight 104 based on requirements. In one or more embodiments, backlight 104 may be a keypad backlight, a display backlight (the display of data processing system 100 not being shown in FIG. 1) and/or a mouse backlight. Alternately, in one or more embodiments, the same backlight (e.g., backlight 104) may illuminate the keypad and the display. In one or more embodiments, in general, backlight 104 may be associated with illumination of one or more Input/Output (I/O) devices (e.g., display 252, keypad 254) of data processing system 100.

Figure 2:
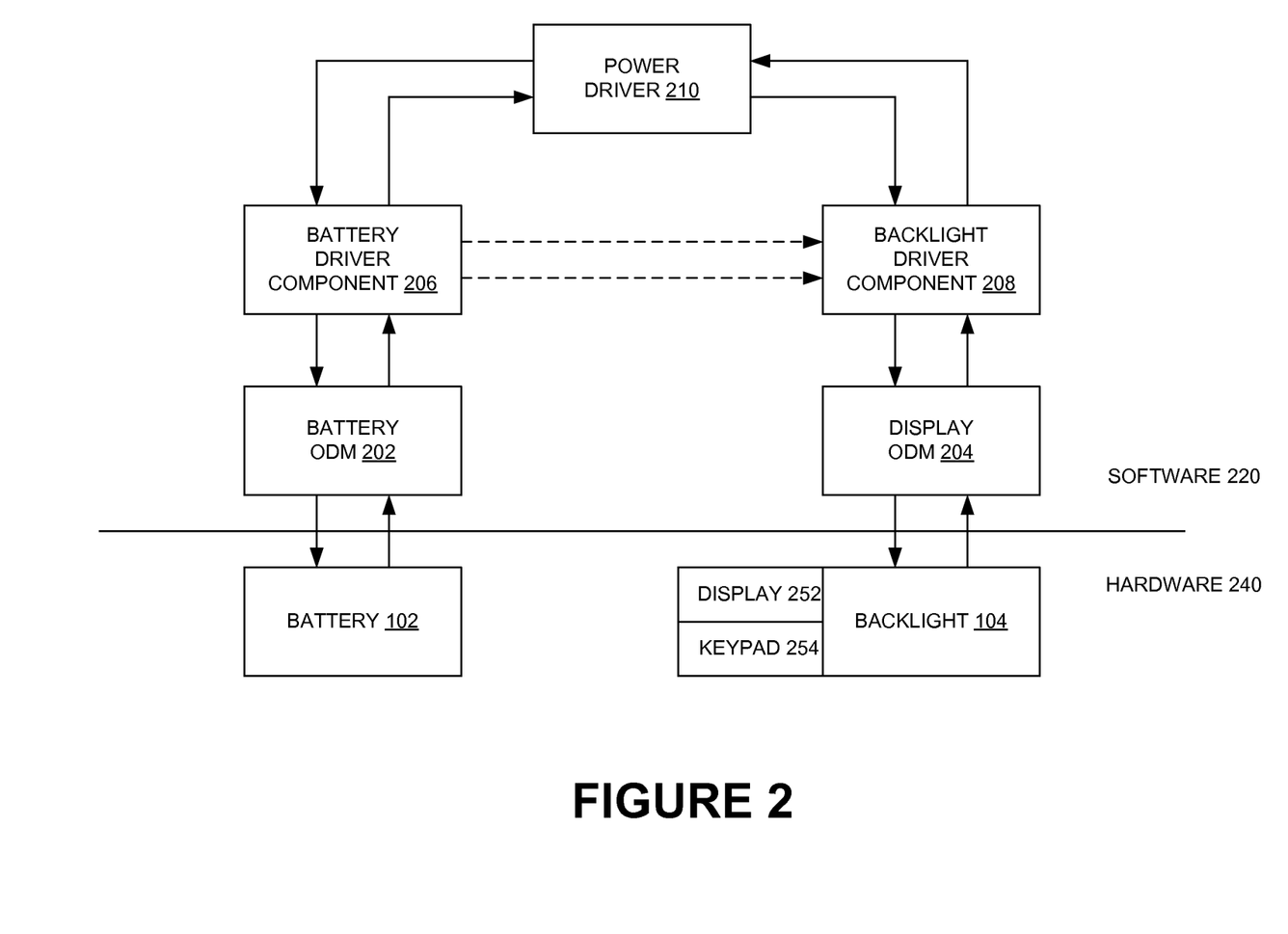
FIG. 2 is a schematic view of power management of the backlight to prolong battery life in the data processing system of FIG. 1 at the software and hardware levels, according to one or more embodiments.

FIG. 2 illustrates backlight 104 power management to prolong battery 102 life in data processing system 100 at the software 220 and hardware 240 levels, according to one or more embodiments. At the hardware 240 level, battery 102 and backlight 104 (e.g., backlight to a Liquid Crystal Display (LCD) screen) are shown. Backlight 104 is shown as being associated with display 252 and keypad 254. To generalize, in one or more embodiments, backlight 104 may be associated with the illumination of one or more I/O devices, of which display 252 and keypad 254 are mere examples. In one or more embodiments, an Original Design Manufacturer (ODM) associated with data processing system 100 may define battery levels based on voltage(s) associated therewith. For example, three ranges of battery levels may be defined, viz., high, low and critical. In one or more operating systems (not shown) executing on data processing system 100, whenever data processing system 100 "runs" on battery 102 and the voltage level associated therewith reaches "low," an icon associated with battery 102 in a taskbar on the display screen may indicate the aforementioned "low" state thereof.

Whenever data processing system 100 "runs" on battery 102 and a voltage level associated with battery 102 reaches "critical," the icon associated therewith may indicate the aforementioned "critical" state thereof and/or housekeeping associated with the operating system executing on data processing system 100 may display a warning message associated with the "critical" state (e.g., a warning message indicating to the user of data processing system 100 that battery 102 needs to be charged or replaced). It is obvious that the "critical" state of battery 102 is associated with a remaining charge on battery 102 being lower than a threshold required to maintain data processing system 100 in a powered on state. Further, it is obvious that the "high" state of battery 102 is associated with the remaining charge on battery 102 being higher than the corresponding value during the "low" state thereof, which, again, is associated with the remaining charge on battery 102 being higher than the corresponding value during the "critical" state.

Backlight 104 may consume more battery 102 power than other components of data processing system 100, and backlight 104 intensity may be proportional to power consumption associated with backlight 104. In an example data processing system 100, backlight driver component 208 (e.g., software driver) of the operating system may control the turning on/off of backlight 104, in conjunction with backlight driver circuit 122.

For example, backlight driver component 208 (e.g., software driver) of embedded OS 172 may enable turning off of backlight 104 after a timeout period, and turning on of backlight 104 during occurrence of any user activity (obviously, "user" refers to the user of data processing system 100). Also, adjusting intensity of backlight 104 may be accomplished through, for example, user settings in a control panel associated with embedded OS 172 (e.g., WinCE) executing on data processing system 100. Now, when data processing system 100 "runs" on battery 102 and the voltage level associated with battery 102 is "critical" (with the backlight 104 being on), then the lifetime (obviously, not the complete lifetime; data processing system 100 may again be powered on through a power supply or a recharged battery 102) of data processing system 100 may be, for example, less than an hour. If the user has unsaved data active when data processing system 100 is shut down, the aforementioned unsaved data may be lost. The user may then have to charge or replace battery 102 (or, connect a power supply) and turn on data processing system 100 once again to initiate new task(s).

FIG. 2 shows battery ODM 202 and display ODM 204 at the software 220 level, which may be interpreted as parameters defined through the appropriate ODMs, according to one or more embodiments. For example, based on the voltage levels associated with battery 102, battery ODM 202 may define the battery flag(s), viz., High, Low and Critical. The aforementioned flag(s) may indicate voltage levels that change with the "states" of battery 102. The "states" of battery 102 may be based on change(s) in the voltage levels associated with battery 102 relative to, for example, threshold values defined for reference purposes. Thus, battery driver component 206 (e.g., software driver) of embedded OS 172 may be configured to monitor the aforementioned flag(s).

Whenever the battery flag switches to "Critical," battery driver component 206 may appropriately signal a "Critical Battery Event" to backlight driver component 208. Backlight driver component 208 may then initiate dimming of the intensity of backlight 104. For example, upon receipt of the signal associated with the "Critical Battery Event" by backlight driver component 208, backlight driver circuit 122 may dim the intensity of backlight 104 in accordance with a control signal from backlight driver component 208.

Whenever power supply (not shown) associated with data processing system 100 is plugged on or charger (not shown) associated therewith is coupled, battery driver component 206 may appropriately signal an "Out of Critical Battery Event" to backlight driver component 208. Backlight driver component 208 may then initiate modifying the intensity of backlight 104 to a normal level. The voltage level associated with the normal intensity of backlight 104 may be stored in registry settings associated with embedded OS 172 executing on data processing system 100. The normal voltage level may be read from the registry settings by backlight driver component 208 prior to backlight driver component 208 modifying the intensity of backlight 104. FIG. 2 shows power driver 210 (e.g., associated with the power supply) communicating with battery driver component 206 and backlight driver component 208 to obtain status of battery 102 and backlight 104.

Thus, backlight driver component 208, in conjunction with battery driver component 206, may maintain the intensity of backlight 104 at a dim level whenever voltage level associated with battery 102 is "critical." The aforementioned dimming of the intensity of backlight 104 is seamless and automatic, without requiring an intervention on the part of the user of data processing system 100. Also, in one or more embodiments, the dimming functionality may be enabled and/or disabled through the registry settings associated with the operating system (e.g., embedded OS 172) executing on data processing system 100.

It is obvious that the dim level associated with backlight 104 may be a power level lower than the normal intensity level. However, the dim level may still be a level at which the user of data processing system 100 is able to view the display screen (e.g., display 252) thereof and accomplish desired task(s). In one example embodiment, the user may determine, through embedded OS 172 executing on data processing system 100, the level to which backlight 104 is to be dimmed during a "critical" level of battery 102. In one or more embodiments, battery driver component 206 and backlight driver component 208 may be set(s) of instructions integrated with embedded OS 172 executing on data processing system 100.

Figure 3:
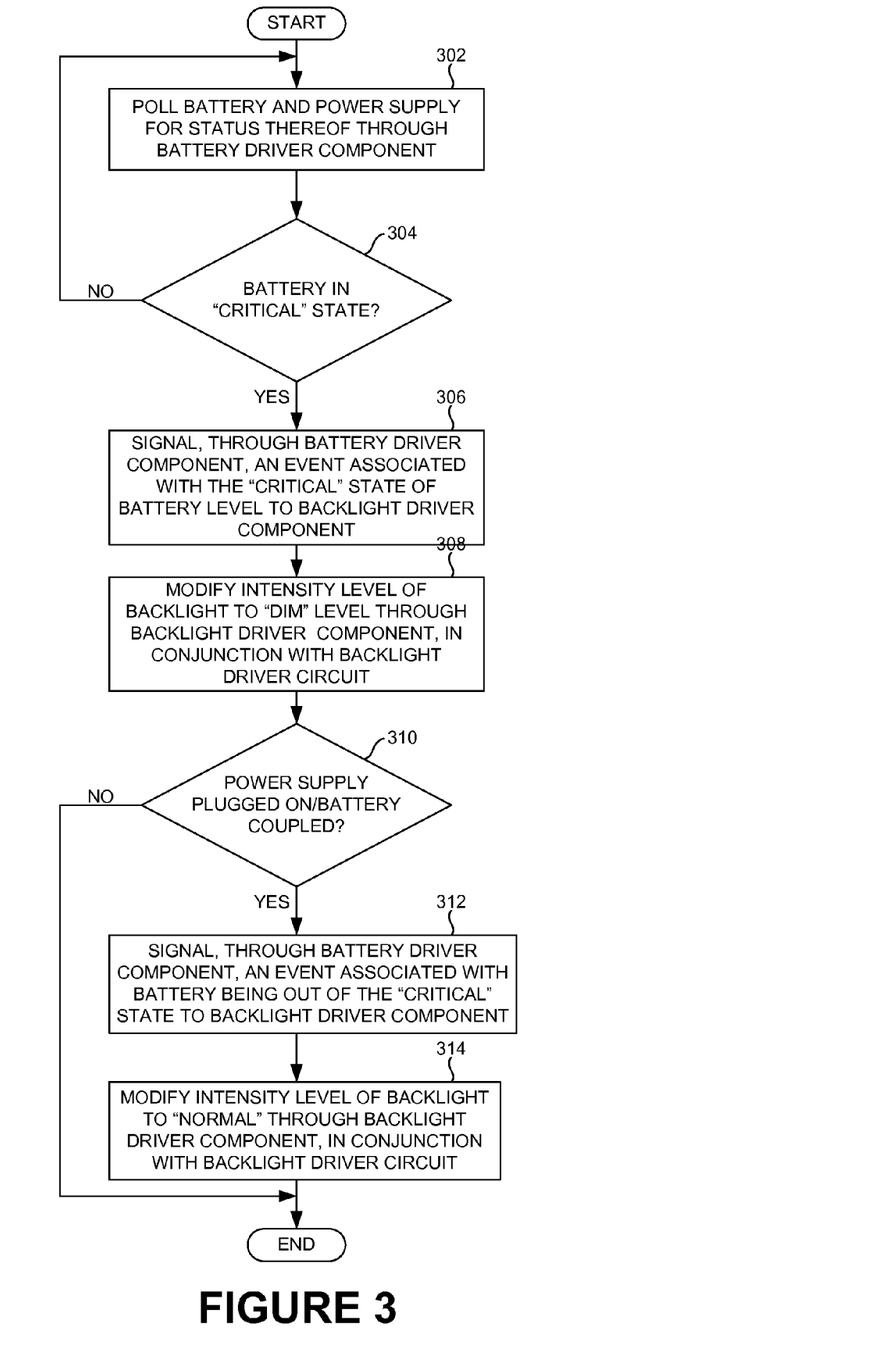
FIG. 3 is a flowchart detailing the operations involved in a method of controlling intensity level(s) of the backlight in the data processing system of FIG. 1 based on state(s) of the battery thereof, according to one or more embodiments.

To summarize, FIG. 3 shows a flowchart detailing the operations involved in a method of controlling the intensity level of backlight 104 in data processing system 100 based on a state of battery 102 thereof, according to one or more embodiments. In one or more embodiments, operation 302 may involve polling (e.g., periodically), through battery driver component 206, for battery 102 and power supply (not shown) status. In one or more embodiments, battery driver component 206 may, thus, be updated with all of the aforementioned information. It is obvious that whenever the power supply is off or decoupled from data processing system 100, data processing system 100 may utilize battery 102 in order to operate.

In one or more embodiments, operation 304 may then involve verifying as to whether the state of battery 102 is "critical." For example, battery driver component 206 may monitor the flags associated with the battery levels, as discussed above. In one or more embodiments, if the battery level is "critical," operation 306 may then involve signaling, through battery driver component 206, an event associated with the "critical" battery level to backlight driver component 208. In one or more embodiments, when backlight driver component 208 receives the signal associated with the "critical" battery level, operation 308 may involve modifying the intensity of backlight 104 to a "dim" level through backlight driver component 208, as discussed above, in conjunction with backlight driver circuit 122.

Thus, in one or more embodiments, backlight 104 may operate at a "dim" level during the "critical" level of battery 102, thereby prolonging the lifetime of battery 102. In one or more embodiments, operation 310 may involve verifying as to whether the power supply is plugged on or the charger associated with battery 102 is coupled. In one or more embodiments, if yes, operation 312 may then involve signaling, through battery driver component 206, an event associated with battery 102 being out of the "critical" level to backlight driver component 208. In one or more embodiments, operation 314 may then involve modifying the intensity level of backlight 104 to the "normal" level through backlight driver component 208, in conjunction with backlight driver circuit 122. For example, as discussed above, backlight driver component 208 may read the "normal" level value from the registry settings associated with embedded OS 172 executing on data processing system 100.

It is obvious that not only the "normal" level associated with the intensity of backlight 104 may be stored in the registry settings associated with the embedded OS 172 but also other levels such as the "dim" level. In one or more embodiments, the power saving(s) associated with the "dim" level of operation of backlight 104 may prolong the lifetime of battery 102. In one or more embodiments, the user of data processing system 100 may be able to perform urgent task(s) even during the "critical" level of battery 102 because of the prolonged lifetime thereof. In one or more embodiments, the user may not suffer a data loss even during the "critical" level of battery 102, in contrast to the dimming option not being available or being disabled (where data processing system 100 is automatically switched off soon after the "critical" level of battery 102 is reached, if power supply is not plugged in and/or battery 102 is not recharged).

Figure 4:
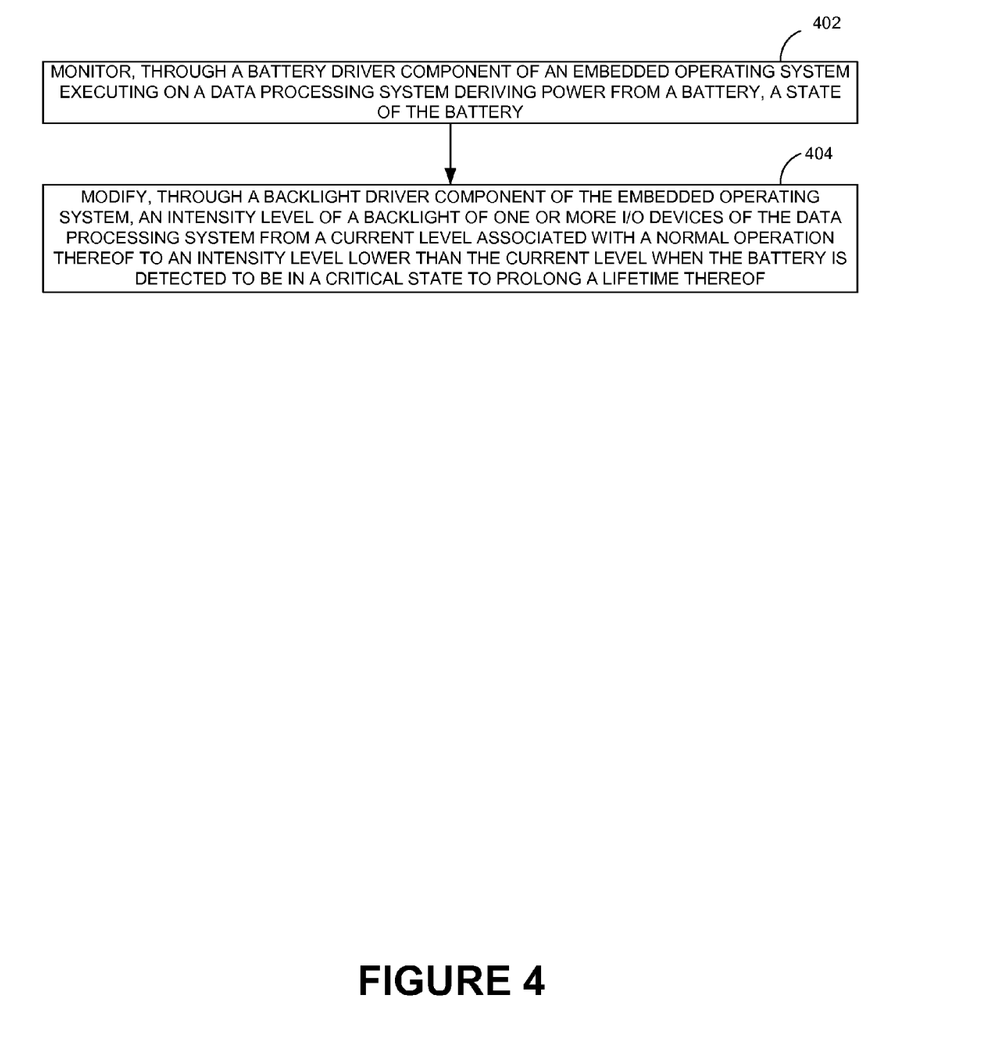
FIG. 4 is a process flow diagram detailing the operations involved in a method of adjusting intensity level(s) of the backlight to prolong a lifetime of the battery of the data processing system of FIG. 1, according to one or more embodiments.

FIG. 4 shows a process flow diagram detailing the operations involved in a method of controlling intensity level(s) of backlight 104 to prolong a lifetime of battery 102 of data processing system 100, according to one or more embodiments. In one or more embodiments, operation 402 may involve monitoring, through battery driver component 206 of an embedded OS 172 executing on data processing system 100 deriving power from battery 102, a state of battery 102. In one or more embodiments, operation 404 may then involve modifying, through backlight driver component 208 of embedded OS 172, an intensity level of backlight 104 of data processing system 100 from a current level associated with a normal operation thereof to an intensity level lower than the current level when battery 102 is detected to be in a critical state to prolong the lifetime of battery 102. In one or more embodiments, the critical state may be associated with a lowest lifetime level of battery 102.

Figure 5:
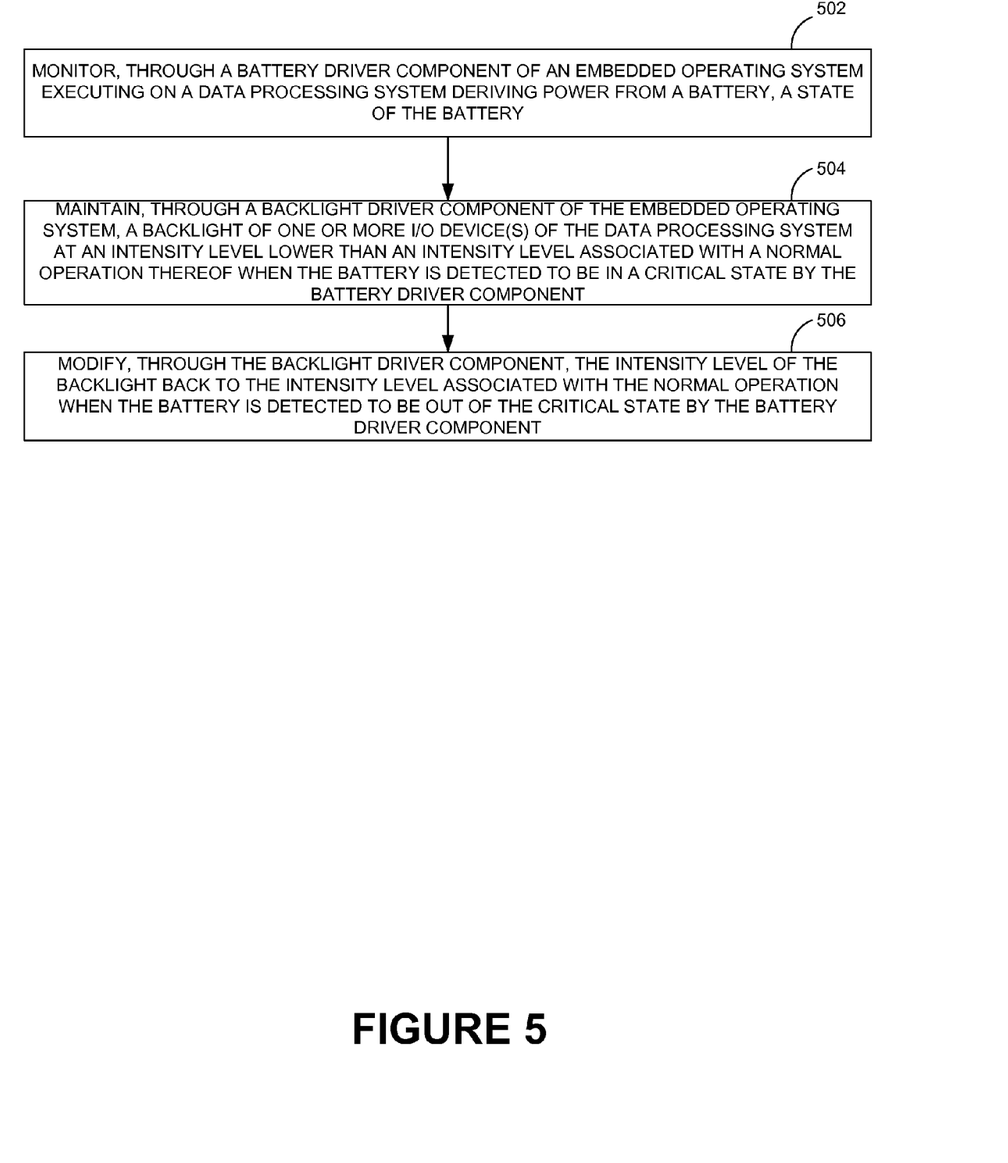
FIG. 5 is a process flow diagram detailing the operations involved in a method of maintaining the backlight at an intensity level lower than an intensity level associated with a normal operation of the data processing system of FIG. 1 to prolong a lifetime of the battery thereof, according to one or more embodiments.

FIG. 5 shows a process flow diagram detailing the operations involved in a method of maintaining backlight 104 at an intensity level lower than an intensity level associated with a normal operation of data processing system 100 to prolong a lifetime of battery 102 of data processing system 100, according to one or more embodiments. In one or more embodiments, operation 502 may involve monitoring, through battery driver component 206 of an embedded OS 172 executing on data processing system 100 deriving power from battery 102, a state of battery 102. In one or more embodiments, operation 504 may involve maintaining, through backlight driver component 208 of embedded OS 172, backlight 104 of data processing system 100 at the intensity level lower than the intensity level associated with the normal operation thereof when battery 102 is detected to be in a critical state associated with a lowest lifetime level thereof by battery driver component 206.

In one or more embodiments, operation 506 may then involve modifying, through backlight driver component 208, the intensity level of backlight 104 back to the intensity level associated with the normal operation when battery 102 is detected to be out of the critical state by battery driver component 206.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative rather than a restrictive sense.

What is claimed is:

1. A method comprising:
monitoring, through a battery driver component of an embedded operating system executing on a data processing system deriving power from a battery, a state of the battery; and
modifying, through a backlight driver component of the embedded operating system, an intensity level of a backlight of at least one Input/Output (I/O) device of the data processing system from an intensity level associated with a normal operation thereof to a lower intensity level when the battery is detected to be in a critical state by the battery driver component to prolong a lifetime thereof, the critical state being associated with a remaining charge on the battery being below a threshold required to maintain the data processing system in a powered on state, the modification of the intensity level of the backlight comprising switching between a plurality of intensity levels of the backlight defined through an Original Design Manufacturer (ODM) thereof and stored in at least one registry setting associated with the embedded operating system, and the plurality of intensity levels comprising both the intensity level associated with the normal operation and the lower intensity level.

2. The method of claim 1, further comprising defining a plurality of levels associated with the battery through another ODM associated therewith, the plurality of levels including a level associated with the critical state of the battery.

3. The method of claim 1, further comprising signaling, through the battery driver component, an event associated with the critical state of the battery to the backlight driver component prior to modifying the intensity level of the backlight.

4. The method of claim 3, further comprising, modifying the intensity level of the backlight to the lower intensity level through a backlight driver circuit, in accordance with a control signal from the backlight driver component.

5. The method of claim 3, further comprising:
signaling, through the battery driver component, an event associated with the battery being out of the critical state to the backlight driver component when at least one of: the data processing system is powered through a power supply and the battery is charged; and
modifying, through the backlight driver component, the intensity level of the backlight of the data processing system from the lower intensity level to the intensity level associated with the normal operation upon receipt of the signal associated with the battery being out of the critical state.

6. The method of claim 1, further comprising:
reading, through the backlight driver component, the lower intensity level from the at least one registry setting prior to modifying the intensity level of the backlight.

7. The method of claim 6, further comprising at least one of enabling and disabling a functionality associated with the modification of the intensity level of the backlight when the battery is in the critical state through the at least one registry setting.

8. A method comprising:
monitoring, through a battery driver component of an embedded operating system executing on a data processing system deriving power from a battery, a state of the battery;
modifying, through a backlight driver component of the embedded operating system, an intensity level of a backlight of at least one I/O device of the data processing device from an intensity level associated with a normal operation thereof to a lower intensity level when the battery is detected to be in a critical state by the battery driver component to prolong a lifetime thereof, the critical state being associated with a remaining charge on the battery being below a threshold required to maintain the data processing system in a powered on state, the modification of the intensity level of the backlight comprising switching between a plurality of intensity levels of the backlight defined through an ODM thereof and stored in at least one registry setting associated with the embedded operating system, and the plurality of intensity levels comprising both the intensity level associated with the normal operation and the lower intensity level;
maintaining, through the backlight driver component of the embedded operating system, the backlight at the lower intensity level following the modification; and modifying, through the backlight driver component, the intensity level of the backlight back to the intensity level associated with the normal operation when the battery is detected to be out of the critical state by the battery driver component.

9. The method of claim 8, further comprising defining a plurality of levels associated with the battery through another ODM associated therewith, the plurality of levels including a level associated with the critical state of the battery.

10. The method of claim 8, further comprising:
signaling, through the battery driver component, an event associated with the critical state of the battery to the backlight driver component.

11. The method of claim 10, further comprising, modifying the intensity level of the backlight to the lower intensity level through a backlight driver circuit, in accordance with a control signal from the backlight driver component.

12. The method of claim 10, further comprising:
signaling, through the battery driver component, an event associated with the battery being out of the critical state to the backlight driver component when at least one of the data processing system is powered through a power supply and the battery is charged prior to modifying the intensity level of the backlight back to the intensity level associated with the normal operation.

13. The method of claim 8, further comprising:
reading, through the backlight driver component, the intensity level associated with the normal operation from the at least one registry setting prior to modifying the intensity level of the backlight back to the intensity level associated with the normal operation.

14. The method of claim 8, further comprising at least one of enabling and disabling a functionality associated with the modification of the intensity level of the backlight when the battery is in the critical state through the at least one registry setting.

15. A data processing system executing an embedded operating system thereon comprising:
a memory comprising instructions associated with the embedded operating system stored therein and at least one registry setting;
a processor communicatively coupled to the memory;
a battery communicatively interfaced with the processor;
at least one I/O device also communicatively interfaced with the processor; and
a backlight of the at least one I/O device, wherein the embedded operating system executing on the data processing system comprises a battery driver component integrated therewith to monitor, in conjunction with the processor, a state of the battery when the data processing system derives power from the battery,
wherein the at least one registry setting comprises a plurality of intensity levels of the backlight defined through an ODM thereof stored therein,
wherein the embedded operating system also comprises a backlight driver component integrated therewith to modify, in conjunction with the processor, an intensity level of the backlight from an intensity level associated with a normal operation thereof to a lower intensity level when the battery is detected to be in a critical state by the battery driver component to prolong a lifetime of the battery, the critical state being associated with a remaining charge on the battery being below a threshold required to maintain the data processing system in a powered on state, and
wherein the backlight driver component is configured to effect the modification of the intensity level of the backlight in conjunction with the processor through switching between the plurality of intensity levels of the backlight stored in the at least one registry setting, the plurality of intensity levels comprising both the intensity level associated with the normal operation and the lower intensity level.

16. The data processing system of claim 15, wherein the battery driver component is further configured to enable signaling, in conjunction with the processor, an event associated with the critical state of the battery to the backlight driver component prior to the backlight driver component modifying the intensity level of the backlight in conjunction with the processor.

17. The data processing system of claim 16, further comprising a backlight driver circuit configured to modify the intensity level of the backlight to the lower intensity level in accordance with a control signal from the backlight driver component.

18. The data processing system of claim 16,
wherein the battery driver component is further configured to signal, in conjunction with the processor, an event associated with the battery being out of the critical state to the backlight driver component when at least one of: the data processing system is powered through a power supply and the battery is charged, and
wherein the backlight driver component is further configured to modify the intensity level of the backlight from the lower intensity level to the intensity level associated with the normal operation upon receipt of the signal associated with the battery being out of the critical state.

19. The data processing system of claim 15,
wherein the backlight driver component is configured to read, in conjunction with the processor, the lower intensity level from the at least one registry setting prior to modifying the intensity level of the backlight.

20. The data processing system of claim 15, wherein the at least one I/O device is at least one of a display and a keypad.

* * * * *